United States Patent
Scheer et al.

(10) Patent No.: US 7,393,590 B2
(45) Date of Patent: *Jul. 1, 2008

(54) BIODEGRADABLE POLY(LACTIC ACID) POLYMER COMPOSITION AND FILMS, COATINGS AND PRODUCTS COMPRISING BIODEGRADABLE POLY(LACTIC ACID) POLYMER COMPOSITIONS

(75) Inventors: Frederic Scheer, Manhattan Beach, CA (US); William Kelly, Bailey, CO (US)

(73) Assignee: Cereplast, Inc., Hawthorne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/788,542

(22) Filed: Feb. 27, 2004

(65) Prior Publication Data

US 2005/0192410 A1    Sep. 1, 2005

(51) Int. Cl.
*B32B 27/08* (2006.01)
*B32B 27/10* (2006.01)
*B32B 27/18* (2006.01)
*B32B 27/20* (2006.01)
*B32B 27/36* (2006.01)

(52) U.S. Cl. .............. 428/480; 428/481; 428/483; 525/437; 525/444; 524/442; 524/452

(58) Field of Classification Search .............. None
See application file for complete search history.

(56) References Cited

U.S. PATENT DOCUMENTS

| | | | |
|---|---|---|---|
| 5,500,465 A * | 3/1996 | Krishnan et al. | 524/47 |
| 5,594,095 A * | 1/1997 | Gruber et al. | 528/354 |
| 5,714,573 A * | 2/1998 | Randall et al. | 528/354 |
| 5,756,651 A * | 5/1998 | Chen et al. | 528/354 |
| 5,773,562 A * | 6/1998 | Gruber et al. | 528/354 |
| 5,798,435 A * | 8/1998 | Gruber et al. | 528/354 |
| 5,798,436 A * | 8/1998 | Gruber et al. | 528/354 |
| 5,883,199 A * | 3/1999 | McCarthy et al. | 525/437 |
| 5,998,552 A * | 12/1999 | Gruber et al. | 525/450 |
| 6,005,068 A * | 12/1999 | Gruber et al. | 528/354 |
| 6,093,791 A * | 7/2000 | Gruber et al. | 528/354 |
| 6,121,410 A * | 9/2000 | Gruber et al. | 528/354 |
| 6,207,792 B1 * | 3/2001 | Gruber et al. | 528/354 |
| 6,291,597 B1 * | 9/2001 | Gruber et al. | 525/450 |
| 6,326,440 B1 * | 12/2001 | Terada et al. | 525/411 |
| 6,869,985 B2 * | 3/2005 | Mohanty et al. | 523/124 |
| 2002/0094444 A1 * | 7/2002 | Nakata et al. | 428/480 |
| 2002/0198332 A1 * | 12/2002 | Kasemura et al. | 525/450 |
| 2004/0143072 A1 * | 7/2004 | Lewis et al. | 525/417 |
| 2007/0203283 A1 * | 8/2007 | Scheer | 524/442 |
| 2007/0243374 A1 * | 10/2007 | Lewis et al. | 428/349 |

FOREIGN PATENT DOCUMENTS

| | | | |
|---|---|---|---|
| JP | 2001-026658 | * | 1/2001 |
| JP | 2001-136658 | * | 1/2001 |
| JP | 2003-171544 | * | 6/2003 |

* cited by examiner

*Primary Examiner*—Vivian Chen
(74) *Attorney, Agent, or Firm*—Bell Boyd & Lloyd LLP

(57) ABSTRACT

The present invention relates to biodegradable polymer compositions comprising poly(lactic acid) and poly(epsilon caprolactone) and co-polyester polymer with adipic acid mixed with organic peroxide and magnesium silicate minerals. In addition, the present invention relates to films, coatings and products made on the basis of said compositions and to a method for their preparation.

20 Claims, No Drawings

BIODEGRADABLE POLY(LACTIC ACID) POLYMER COMPOSITION AND FILMS, COATINGS AND PRODUCTS COMPRISING BIODEGRADABLE POLY(LACTIC ACID) POLYMER COMPOSITIONS

FIELD OF THE INVENTION

The present invention relates to Biodegradable polymer compositions comprising poly(lactic acid) and poly(epsilon caprolactone). In addition, the present invention relates to films, coatings and products made on the basis of said compositions and to a method for their preparation.

BACKGROUND OF THE INVENTION

Packaging material and disposable beakers, cups and cutlery are used nowadays widely and allow that food material may be sold and/or consumed under hygienic conditions. Such disposable materials and objects are highly estimated by the consumers and the retailers, since they may be simply disposed after use and do not have to be washed and cleaned like conventional dishes, glasses or cutlery.

Yet, the widespread and even growing use of such materials result in a mounting amount of litter produced each day. Currently, the plastic waste is either provided to garbage incinerators or accumulates in refuse dumps, with both of the above-mentioned solutions for waste disposal being associated with problems for the environment.

In addition, paper and composite materials are often provided with a coating, such as e.g. polymeric or wax coatings, for increasing the strength of the paper stock or of the basis composite material, imparting water resistance, enhancing gloss, improving barrier properties, etc. These polymeric or wax coatings give however rise to various problems when articles comprising polymeric or wax coatings are subjected to recycling or re-pulping processes.

Thus, there is a need in the art to obviate the above problem and to provide materials, which combine the advantages of currently used plastics material, do not add to environmental pollution and assist to simplify recycling or repulping processes.

Several Biodegradable polymers are already known in the state of the art and comprise materials e.g. on the basis of poly(glycolic acid), poly(epsilon-caprolactone), poly(lactic acid), and polydioxanone. These polymers require however rather complicated production steps and are rather cost-intensive and therefore currently mainly restricted to high value medical applications requiring bioabsorbable materials.

An object of the present invention is thus to provide a composition, which composition is degraded under normal environmental conditions such as composting including humidity and/or water, air, light, and/or soil bacteria in a controlled time period which is significantly shorter than the time period required for the degradation of conventional plastic materials, such as e.g. polyethylene.

Additionally, such a composition should provide properties for the resulting material required for the respective applications, such as e.g. for the production of articles, films, and coatings. Furthermore, such a composition should be producible at low costs and should be appropriate for a production of objets comprising said composition in large numbers. In addition, such a composition should allow to be processed by means of devices and methods of the state of the art. Moreover, such a composition should provide the possibility to be at least partially producible from renewable resources. When applied as a film or a coating on paper or on a composite material, such a composition should provide degradation properties facilitating a re-pulping or recycling of said paper or composite materials.

These and other objectives will become apparent from the subsequent detailed description of the present invention, which provides a Biodegradable composition, comprising between 40 and 85% by weight of poly(lactic acid), and between 10 and 40% by weight of poly(epsilon caprolactone), each on the basis of the total weight of the Biodegradable composition.

SUMMARY OF THE INVENTION

A composition of the present invention is biodegradable when exposed to specific environmental conditions, such as composting, will result in a loss of some properties that may be measured by standard methods appropriate to the plastic and in the application in a period of time that determines its classification. For instance composting is a managed process that controls the biological decomposition and transformation of biodegradable materials into humus-like substance called compost: the aerobic mesophilic and thermophilic degradation of organic matter to make compost; the transformation of biologically decomposable material through a controlled process of biooxidation that proceed through mesophilic and thermophilic phases and results in the production of carbon dioxide, water, minerals, and stabilized organic matter (compost or humus) (ASTM Terminology) Consequently all main components, poly(lactic acid) and poly(epsilon caprolactone) will be degraded to small organic fragments which will create stabilized organic matter and will not introduce any hazard or heavy metals into soil.

As a result, objects made from the composition of the present invention will not contribute to a further increase of refuse dumps, on the contrary will allow creation of organic fertilizers such as compost, while such objects simultaneously provide all advantages of disposable objects highly estimated by the consumers and producer. Objects made of a composition according to the present invention may be disposed after use, are essentially of light weight, and have not to be transported to a location where they have to be cleaned. In particular, objects made from a composition according to the present invention provide the advantage that objects thrown away in parks or at the beach will degrade and will vanish after some time. However, this composition is not created to serve as a "license to litter" the environment.

In addition, the compositions according to the present invention provide physical properties not inherent to poly (lactic acid) and provides improvements with respect to the processability, production costs and heat resistance along with improved flexibility and ductility.

Moreover, a composition according to the present invention may be produced primarily or partially from renewable sources, when desired making the products truly biobased. In addition, a composition according to the present invention may be adapted to various processing methods of the state of the art.

DETAILED DESCRIPTION OF THE INVENTION

The present invention relates to a Biodegradable plastic. The term "bio-degradable plastic" pertains to a Biodegradable plastic in which the degradation results from the action of naturally occurring microorganisms such as bacteria, fungi, and algae. A degradable plastic is a plastic designed to undergo a significant change in its chemical structure under specific environmental conditions, resulting in a loss of some properties that may be measured by standard tests methods appropriate to the plastic and the application in a period of time that determines its classification. Depending on the additional components present in the composition and the dimensions of the object made from said biodegradable material, the time period required for a degradation will vary and may also be controlled when desired. Generally, the time span for biodegradation will be significantly shorter than the time span required for a degradation of objects made from conventional plastic materials having the same dimensions, such as e.g. polyethylene, which have been designed to last for as long as possible. For example, cellulose and Kraft paper is to biodegrade within 83 days in a compost environment. Our formulation is to biodegrade in a shorter period of time and will pass the tests required by ASTM 6400 D99, which demand that compostable plastic would biodegrade within less than 180 days. Articles made from PE would not degrade under normal composting conditions and PLA-based article would degrade in compost environment in weeks (about 6 to 8 weeks).

A Biodegradable composition according to the present invention comprises between 40 and 85% by weight of poly (lactic acid), between 10 and 40% by weight of poly(epsilon caprolactone), and between 5 and 10% by weight of mineral particles, comprising magnesium silicate, each on the basis of the total weight of the Biodegradable composition.

A composition according to the present invention may be obtained by mixing or blending the respective amounts of poly(lactic acid) and of poly(epsilon caprolactone) together. This may be performed according to any method of the state in the art. For example, poly(lactic acid) and poly(epsilon caprolactone) may be mixed in pure form, for example blended by means of a mill roll blending, and heated to a temperature chosen according to the general knowledge in the art such that at least one of the above-mentioned components is partially or essentially completely molten. Poly(lactic acid) and poly(epsilon caprolactone) may also be mixed in a solvent and at a temperature chosen according to the general knowledge in the art such that at least one of the above-mentioned components is partially or essentially completely dissolved.

Poly(lactic acid) may be represented by the following structure formula:

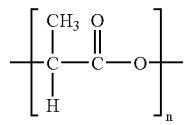

Wherein n for example can be an integer between 10, and 0.250. (Poly(lactic acid) can be prepared according to any method known in the state of the art. For example, poly(lactic acid) can be prepared from lactic acid and/or from one or more of D-lactide (i.e. a dilactone, or a cyclic dimer of D-lactic acid), L-lactide (i.e. a dilactone, or a cyclic dimer of L-lactic acid), meso D,L-lactide (i.e. a cyclic dimer of D-, and L-lactic acid), and racemic D,L-lactide (racemic D,L-lactide comprises a 1/1 mixture of D-, and L-lactide).

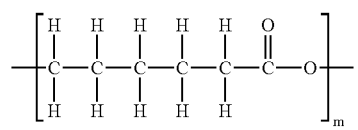

Poly(epsilon caprolactone) may be represented by the following structure formula:

Wherein m for example can be an integer between 10 and 150. Poly(epsilon caprolactone) can be prepared according to any method known in the state of the art. For example, poly (epsilon caprolactone) can be prepared by ring opening polymerization of ε-caprolactone monomer with alcohol initiators.

According to another approach, a composition according to the present invention may be obtained by mixing respective amounts of poly(lactic acid) polymer precursors and of poly (epsilon caprolactone) or of respective amounts of a poly (lactic acid) and of precursors of poly(epsilon caprolactone) with or without a solvent and subjecting the resulting mixture to a polymerization. Poly(lactic acid) polymer precursors are for example lactic acid, cyclic or linear oligomers of lactic acid resulting from condensation reactions of two to fifty lactic acid units, such as the above-mentioned lactides and can have any stereoconfiguration. Compositions made from other poly(lactic acid) polymer precursors and/or precursors of poly(epsilon caprolactone) can also be used according to the general knowledge of a skilled person in the art.

In particular, a Biodegradable composition according to the present invention comprises between 40 and 60% by weight of poly(lactic acid) and between 20 and 40% by weight of poly(epsilon caprolactone) or 70 and 85% by weight of poly(lactic acid) and between 10 and 25% by weight of poly(epsilon caprolactone) and especially between 45 and 55% by weight of poly(lactic acid) and between 25 and 35% by weight of poly(epsilon caprolactone) or 72 and 80% by weight of poly(lactic acid) and between 15 and 20% by weight of poly(epsilon caprolactone), each on the basis of the total weight of the Biodegradable composition.

A Biodegradable polymer according to the present invention also comprises between 0 and 10% by weight, preferably between 5% and 10% by weight, more preferably between 6% and 9% by weight of mineral particles, each on the basis of the total weight of the Biodegradable composition, said mineral particles comprising magnesium silicate. Examples for such minerals are silicates, such as e.g. montmorillonite. The incorporation of the minerals has been found to change the structure of the polymer chain and made it adequate for processing and for several physical properties necessary to the application such as heat resistance for instance, along with improved flexibility and ductility. For example, the mineral particles may have a size of 0.5 to 2.0 μm, more preferably of 0.7 to 1.5 μm.

Moreover, during the preparation of a Biodegradable polymer according to the present invention an organic peroxide may be added to the reaction mixture in an amount of less than 5% by weight, on the basis of the total weight of the Biodegradable final polymer composition.

Examples for organic peroxides which may be used for preparing a composition according to the present invention are e.g. diacetyl peroxide, cumyl hydro peroxide, and dibenzoyl peroxide. Other organic peroxides known to a skilled person can be used as well. The organic peroxides serve as radical starter molecules initiating a polymerization and help to provide connections, in particular covalent bonds, between the components present in a composition according to the present invention.

Preferably, less than 4% of organic peroxide, more preferably less than 2%, more preferably between 0.1% and 2% of organic peroxide, each on the basis of the total weight of the final Biodegradable composition, may be added to the reaction mixture for preparing the Biodegradable polymer according to the present invention.

A Biodegradable polymer composition may further comprise up to 5% of a mono-ester, preferably between 0.1 and 4% by weight of a mono ester, on the basis of the total weight of the Biodegradable composition. The mono ester may be a carboxylic acid, a sulfonic acid or a phosphoric acid having e.g. between 2 and 20 carbon atoms and comprising aliphatic (having branched or linear chains) and/or aromatic structural units. In particular, said mono ester can be a mono ester of a compound comprising at least two carboxyl groups and/or may be for example chosen from the group consisting of adipic acid and lactic acid. In particular, an addition of a mono ester can be useful when formulating injection molding formulations.

Additionally, a Biodegradable polymer composition of the present invention can also comprise one or more plasticizers. A plasticizer as used in a composition according to the present invention, as well as the thereof resulting degradation products should be preferably associated with essentially no or only low environmental risks, such that upon degradation of a composition of the present invention the respective site where the degradation takes place will not or essentially not be polluted. Plasticizers for use in a composition according to the present invention can therefore be for example naturally occurring compounds. Examples for plasticizers are e.g. esters of citric acid as are described in U.S. Pat. No. 5,556,905, which document is incorporated herein by way of reference.

A Biodegradable polymer composition according to the present invention may also comprise between 0 and 5% by weight of co-polyester polymer with adipic acid, preferably between 0.1 and 4.5% by weight of co-polyester polymer with adipic acid, more preferably between 1 and 4% by weight of co-polyester polymer with adipic acid, each on the basis of the total weight of the Biodegradable composition.

Depending on the specific applications desired, a Biodegradable polymer composition of the present invention can also comprise further additives or components well known in the state of the art, such as e.g. natural coloring agents, additional polymeric compounds, cellulose, etc.

A Biodegradable polymer composition according to the present invention can be used for various applications and should not be restricted to the exemplarily disclosed applications. For example also applications in the medical field, such as e.g. for sutures, and drug release matrices, or in the print industry are possible.

A composition of the present invention may be used for the production of various articles, such as e.g. molded articles and/or extruded articles. In particular, a composition according to the present invention may be used for preparing coatings and films, in particular extrusion coatings and extrusion films. As should be clear, a "molded article" (or "extruded article") may also be part of another object, such as e.g. an insert in a container or a knife blade or fork insert in a corresponding handle.

A coating or a film according to the present invention comprises between 40 and 85% by weight of poly(lactic acid), and between 10 and 40% by weight of poly(epsilon caprolactonee), each on the basis of the total weight of the Biodegradable composition.

A coating formulation which may be applied e.g. according to extrusion coating processes can comprise 70 and 85% by weight of poly(lactic acid), and between 10 and 25% by weight of poly(epsilon caprolactone) and preferably between 72 and 80% by weight of poly(lactic acid) and between 15 and 20% by weight of poly(epsilon caprolactone), each on the basis of the total weight of the Biodegradable composition. In addition, a coating formulation can comprise less than 2% of organic peroxide, preferably between 0.1% and 1.8% of organic peroxide, more preferably between 0.5% and 1.5% of organic peroxide, each on the basis of the total weight of the Biodegradable composition. As outlined in detail before, the composition for the preparation of such coatings can comprise in addition to the above-mentioned components mineral particles comprising magnesium silicate, organic peroxide(s), mono ester(s), and/or plasticizer(s). Depending on the specific application, further additives or natural coloring agents can be added to a composition according to the present invention.

A coating formulation according to the present invention can be applied by any coating application method of the state of the art, in particular by extrusion coating application methods of the state of the art. A coating made from a composition according to the present invention can have a thickness of e.g. between 0.25 and 30.0 µm and preferably between 0.5 and 80.00 µm.

A coating on the basis of a composition according to the present application may be applied on essentially any desired carrier material, such as e.g. paper, plastics, metals, wood, and composite materials comprising at least one of the above-mentioned carrier materials, etc. When appropriate a coating comprising a composition according to the present invention can be applied on one or more intermediate layers present on a carrier material or can be provided with additional top or covering layers or coatings.

An application of a composition according to the present invention on a Biodegradable carrier, such as e.g. paper, provides the advantage that both carrier, as well as the coating may be degraded upon exposition to water, and/or light, and/or soil bacteria. In particular, when the carrier is paper, the paper material may be submitted to re-pulping processes without the presence of essentially non-Biodegradable and thereby interfering plastic or wax coatings.

For example food service-ware, plates, cups, packaging, in particular ice cream packaging, cardboard boxes, trays made from paper or one of the other above-mentioned carrier materials can be coated with a coating, in particular an extrusion coating comprising a composition according to the present invention.

When preparing a formulation for the preparation of films made e.g. by Blown Film Extrusion processes, a composition according to the present invention can be used which comprises for example between 40% and 60% by weight of poly (lactic acid), less than 5% by weight of co-polyester polymer with adipic acid, between 20% and 40% by weight of poly (epsilon caprolactone), between 5% and 10% by weight of mineral particles comprising magnesium silicate, less than 5% by weight of organic peroxide, and less than 10% by weight of plasticizers, preferably between 45% and 55% by weight of poly(lactic acid), between 0.1 and 4.5% by weight of co-polyester polymer with adipic acid, between 22% and 35% by weight of poly(epsilon caprolactone), between 6% and 9% by weight of mineral particles comprising magnesium silicate, between 0.1 and 4.5% by weight of organic peroxide, and between 0.1 and 8% by weight of plasticizers, more preferably between 47% and 52% by weight of poly (lactic acid), between 1 and 4% by weight of co-polyester polymer with adipic acid, between 25% and 30% by weight of poly(epsilon caprolactone), between 7% and 8% by weight of mineral particles comprising magnesium silicate, between 1 and 4% by weight of organic peroxide, and between 0.5 and 6% by weight of plasticizers, each on the basis of the total weight of the Biodegradable composition. As outlined in detail before, the composition for the preparation of such films can comprise in addition to the above-mentioned components also mono ester(s), and depending on the specific application, further additives or coloring agents. The term "film" as used in the present invention comprises both self-supporting films, as well as non-self-supporting films. A film according to the present invention can have a thickness of e.g. between 10 and 55 µm and preferably between 20 and 35 µm.

A film on the basis of a composition according to the present invention may be applied on essentially any desired carrier material, such as e.g. paper, plastics, metals, wood, and composite materials comprising at least one of the above-mentioned carrier materials, etc. When appropriate, a coating comprising a composition according to the present invention can be applied on one or more intermediate layers present on the carrier material or can be provided with additional top or covering layers or coatings.

Articles of the present invention produced on the basis of a film formulation, such as e.g. a blown film extrusion formulation or a flexible film formulation, are for example films for bags, such as trash bags, as well as grocery bags, or films for sealing containers, as well as films for an application on food service-ware, plates, cups, packaging, in particular ice cream packaging, cardboard boxes, trays made from paper or one of the other above-mentioned carrier materials.

In addition, the present invention provides a method of producing an article comprising a Biodegradable composition, said method comprising the steps of providing a Biodegradable composition comprising between 40 and 85% by weight of poly(lactic acid), and between 10 and 40% by weight of poly(epsilon caprolactone), each on the basis of the total weight of the Biodegradable composition; and preparing a film or coating from said composition and optionally applying said film or coating on an article comprising a material selected from the group consisting of paper, plastics, wood or composite materials comprising at least one of the above-mentioned materials.

Processes for preparing coatings and films, such as e.g. extrusion coating application and blown film extrusion, and/or articles such as e.g. injection molding, profile extrusion and thermoform extrusion are processes known to a skilled person and are described for example by ASTM; Injection Molding—the process of forming a material by forcing it, in a fluid state and under pressure, through a runner system (sprue, runner, gates) into the cavity of a closed mold.; Extrusion—a process in which heated or unheated plastic is forced through a shaping orifice (a die) in one continuously formed shape, as in film, sheet, rod, or tubing; Blow Molding—a method of fabrication in which a heated parison is forced into the shape of a mold cavity by internal cavity pressure; Forming—a process in which the shape of plastic pieces such as sheets, rods, or tubes is changed to the desired configuration; Thermoplastic—a plastic that repeatedly can be softened by heating and hardened by cooling through a temperature range characteristic of the plastic, and that in the softened state can be shaped by flow into articles by molding or extrusion. (ASTM D 883-00)

DESCRIPTION OF THE CURRENTLY PREFERRED EMBODIMENTS

The present invention will be described now in detail on the basis of the following non-limiting examples given by way of an example only.

EXAMPLE 1

Extrusion Coating Formulation

An extrusion coating formulation is prepared which comprises 75 to 90% by weight poly(lactic acid), 10 to 25% by weight poly(epsilon caprolactone) (trade name TONE from DOW material), 0.25 to 1% by weight of 2,5-Dimethyl-2,5-di(t-butyl peroxy) hexane Poly(lactic acid) and poly(epsilon caprolactone) are mixed by means of twin screw compounder at a temperature of about 160° C. during 2 to 10 minutes. Then, the organic peroxide is added in portions to said reaction mixture during a few minutes. The resulting mixture is further subjected to blending the resulting resin having a grain size of 5 to 10 mm and is filled into an extrusion coating device, heated and is coated on a paper. The coating has a thickness of 10 µm to 35 µm.

EXAMPLE 2

Blown Film Extrusion Formulation

A blown film extrusion formulation is prepared which comprises
60% by weight poly (lactic acid)
10% by weight (co-polyester polymer with adipic acid)
10% by weight (poly epsilon caprolactone)
7% by weight of magnesium silicate
1% by weight 2,5-Dimethyl-2,5-di(t-butyl peroxy) hexane
12% by weight tributyl citrate The above-mentioned compounds are mixed via extrusion. The resulting mixture is filled in a blow film extrusion device at a temperature lower than 210° C. and a self-supporting film having a thickness between 15 µm and 55 µm is obtained which may be used for trash or grocery bags.

Numerous modifications and variations of the present invention are possible in light of the above teachings. It is therefore to be understood that within the scope of the appended claims, the invention may be practiced otherwise than as specifically described herein.

The invention claimed is:

1. A biodegradable composition made from starting materials comprising:
   between 40 and 85% by weight of poly(lactic acid),
   between 10 and 40% by weight of poly(epsilon caprolactone),
   between 0.1 and 4.5% by weight of co-polyester polymer with adipic acid, and
   an organic peroxide in an amount between 0.1 and 4.5% by weight, each on the basis of the total weight of the biodegradable composition.

2. The biodegradable composition according to claim 1, said composition comprising at least magnesium and silicon.

3. The biodegradable composition according to claim 1, to which composition during its preparation less than 2% of an organic peroxide, on the basis of the total weight of the final biodegradable composition, has been added.

4. The biodegradable composition according to claim 3, to which composition during its preparation between 0.1 to 1.8% of an organic peroxide, on the basis of the total weight of the final biodegradable composition, has been added.

5. The biodegradable composition according to claim 1, wherein said organic peroxide is selected from the group consisting of diacetyl peroxide, cumyl-hydro-peroxide, dibenzoyl peroxide, 2,5-dimethyl-2,5-di(terbutylperoxy)-hexane, and mixtures thereof.

6. A film or coating comprising a biodegradable composition, said biodegradable composition made from starting materials comprising:
   between 40 and 85% by weight of poly(lactic acid),
   between 10 and 40% by weight of poly(epsilon caprolactone),
   between 5 and 10% by weight of magnesium silicate, an organic peroxide in an amount between 0.1 and 4.5% by weight, wherein said organic peroxide is added to a mixture of said poly(lactic acid) and poly(epsilon caprolactone), and a co-polyester polymer with adipic acid between 0.1 and 4.5% by weight, each on the basis of the total weight of the biodegradable composition.

7. The film or coating according to claim 6, wherein said film or coating is on an article comprising a material selected from the group consisting of paper, plastics, wood and composite materials.

8. The film or coating according to claim 6, to which composition during its preparation less than 2% of an organic peroxide, on the basis of the total weight of the final biodegradable composition, has been added.

9. The film or coating according to claim 6, to which composition during its preparation between 0.1 to 1.8% of an organic peroxide, on the basis of the total weight of the final biodegradable composition.

10. The film or coating according to claim 9, wherein said organic peroxide is selected from the group consisting of diacetyl peroxide, cumyl hydro peroxide, and dibenzoyl peroxide.

11. The film or coating according to claim 6, said biodegradable composition further comprising at least two of the elements selected from the group consisting of magnesium, aluminum, and silicon.

12. The film or coating according to claim 6, said composition further comprising plasticizers.

13. The film or coating according to claim 6, said composition further comprising up to 5% of a mono-ester, on the basis of the total weight of the biodegradable composition.

14. A molded or formed article made from starting materials comprising a biodegradable composition, the biodegradable composition comprising between 40 and 85% by weight of poly(lactic acid), between 10 and 40% by weight of poly(epsilon caprolactone), between 0.1 and 4.5% by weight of co-polyester polymer with adipic acid, between 5 and 10% by weight of magnesium silicate, and an organic peroxide in an amount between 0.1 and 4.5% by weight, wherein the organic peroxide is added to a mixture of the poly(lactic acid) and poly(epsilon caprolactone), each on the basis of the total weight of the biodegradable composition.

15. A molded or formed article according to claim 14, wherein said molded or formed article is selected from the group consisting of utensils, table service-ware forks, spoons, knives, chopsticks, containers, cups, foam material products, and pots.

16. An article comprising a section made of a material selected from the group consisting of paper, plastics, wood and composite materials, said section being coated with a coating or a film, said coating or film made from starting materials comprising between 40 and 85% by weight of poly(lactic acid), between 10 and 40% by weight of poly(epsilon caprolactone), and between 5 and 10% by weight of magnesium silicate each on the basis of the total weight of the coating or film, wherein an organic peroxide in an amount between 0.1 and 4.5% by weight is added to a mixture of said poly(lactic acid) and poly(epsilon caprolactone) on the basis of the total weight of the coating or film, and comprising a co-polyester polymer with adipic acid between 0.1 and 4.5% by weight on the basis of the total weight of the composition.

17. An article of claim 16, said article being selected from the group consisting of food service-ware, plates, cups, packaging, cardboard boxes, and trays.

18. A method of producing an article comprising a biodegradable composition, the method comprising:
   providing a biodegradable composition, said composition comprising
   between 40 and 85% by weight of poly(lactic acid),
   between 10 and 40% by weight of poly(epsilon caprolactone),
   a co-polyester polymer with adipic acid between 0.1 and 4.5% by weight by weight, and
   between 5 and 10% by weight of mineral particles comprising magnesium silicate, each on the basis of the total weight of the biodegradable composition, wherein an organic peroxide in an amount between 0.1 and 4.5% by weight is added to a mixture of poly(lactic acid) and poly(epsilon caprolactone) on the basis of the total weight of the final biodegradable composition; and
   preparing a film or coating from said composition.

19. The method of claim 18 including the step of applying said film or coating on an article comprising a material selected from the group consisting of paper, plastics, wood and composite materials.

20. A method of producing a biodegradable composition, the method comprising:
   (i) providing a composition comprising between 40 and 85% by weight of poly(lactic acid), between 10 and 40% by weight of poly(epsilon caprolactone), between 0.1 and 4.5% by weight of co-polyester polymer with adipic acid, an organic peroxide in an amount between 0.1 and 4.5% by weight, and between 5 and 10% by weight of mineral particles, comprising magnesium silicate, each on the basis of the total weight of the biodegradable composition;
   (ii) mixing the constituents of (i);
   (iii) heating the mixture to a temperature 160° C. to 210° C.; and
   (iv) forming the resultant mixture to obtain a desired shape.

* * * * *